United States Patent
Huang et al.

(10) Patent No.: US 10,991,996 B2
(45) Date of Patent: Apr. 27, 2021

(54) BATTERY HEAT EXCHANGE SYSTEM

(71) Applicant: CONTEMPORARY AMPEREX TECHNOLOGY CO., LIMITED, Ningde (CN)

(72) Inventors: Xiaoteng Huang, Ningde (CN); Yanlong Gu, Ningde (CN); Ruobo You, Ningde (CN)

(73) Assignee: CONTEMPORARY AMPEREX TECHNOLOGY CO., LIMITED, Fujian Province (CN)

( * ) Notice: Subject to any disclaimer, the term of this patent is extended or adjusted under 35 U.S.C. 154(b) by 409 days.

(21) Appl. No.: 15/876,993

(22) Filed: Jan. 22, 2018

(65) Prior Publication Data
US 2018/0212285 A1 Jul. 26, 2018

(30) Foreign Application Priority Data
Jan. 22, 2017 (CN) .......................... 201710052645.3

(51) Int. Cl.
*H01M 10/613* (2014.01)
*H01M 10/625* (2014.01)
(Continued)

(52) U.S. Cl.
CPC ......... *H01M 10/613* (2015.04); *F28F 9/0246* (2013.01); *F28F 9/0248* (2013.01);
(Continued)

(58) Field of Classification Search
CPC ........... H01M 10/613; H01M 10/6556; H01M 10/6568; H01M 10/625; H01M 10/615; F28F 9/0248; F28F 9/0246
See application file for complete search history.

(56) References Cited

U.S. PATENT DOCUMENTS 4,007,315 A * 2/1977 Brinkmann .............. B60K 1/04
429/62
4,517,263 A 5/1985 Reiss
(Continued)

FOREIGN PATENT DOCUMENTS

CN 102751547 B 4/2016
CN 205194812 U 4/2016
(Continued)

OTHER PUBLICATIONS

Contemporary Amperex Technology Co., Limited, Extended European Search Report, EP 18151323.5, dated Jun. 25, 2018, 7 pgs.
(Continued)

*Primary Examiner* — Ula C Ruddock
*Assistant Examiner* — Matthew W Van Oudenaren
(74) *Attorney, Agent, or Firm* — Morgan, Lewis & Bockius LLP

(57) ABSTRACT

The present disclosure provides a battery heat exchange system which comprises a liquid feeding mechanism, a heat exchange mechanism and a liquid draining mechanism. The liquid feeding mechanism provides a circulating liquid. The heat exchange mechanism is connected with the liquid feeding mechanism and comprises a plurality of heat exchange units and a plurality of connecting units; each heat exchange unit is used to heat or cool a corresponding battery module, and the plurality of connecting units are used to connect the heat exchange units together in series-parallel. The liquid draining mechanism is connected with the heat exchange mechanism, and the circulating liquid provided by the liquid feeding mechanism flows through the heat exchange mechanism and then is drained from the liquid draining mechanism.

11 Claims, 9 Drawing Sheets

(51) Int. Cl.
  *H01M 10/6568* (2014.01)
  *H01M 10/6556* (2014.01)
  *F28F 9/02* (2006.01)
(52) U.S. Cl.
  CPC ..... *H01M 10/625* (2015.04); *H01M 10/6556* (2015.04); *H01M 10/6568* (2015.04)

(56) References Cited

U.S. PATENT DOCUMENTS

| | | | | |
|---|---|---|---|---|
| 5,620,057 A | * | 4/1997 | Klemen | ................ B60L 50/64 |
| | | | | 180/68.5 |
| 2009/0140515 A1 | * | 6/2009 | Ichimura | ................ F16L 39/00 |
| | | | | 285/124.5 |
| 2018/0241102 A1 | * | 8/2018 | Kim | ................ H01M 10/6568 |

FOREIGN PATENT DOCUMENTS

| | | |
|---|---|---|
| CN | 205646066 U | 10/2016 |
| CN | 106299541 A | 1/2017 |
| WO | WO-2011083976 A2 | 7/2011 |
| WO | WO-2014086991 A1 | 6/2014 |

OTHER PUBLICATIONS

Contemporary Amperex Technology Co., Limited, First Office Action, CN201710052645.3, dated Jun. 24, 2019, 9 pgs.

* cited by examiner

BATTERY HEAT EXCHANGE SYSTEM

REFERENCE TO RELATED APPLICATIONS

The present application claims priority to Chinese patent application No. 201710052645.3, filed on Jan. 22, 2017, which is incorporated herein by reference in its entirety.

FIELD OF THE PRESENT DISCLOSURE

The present disclosure relates to the field of battery heat management, and particularly relates to a battery heat exchange system.

BACKGROUND OF THE PRESENT DISCLOSURE

With the development of new energy vehicles, the requirement for the new energy vehicles is higher and higher, and the focuses of people's attention are driving mileage, working performance and working life of the new energy vehicles. In order to satisfy the demand of customers, battery manufacturers usually make the power battery bigger and bigger, the number of battery modules is larger and larger, which makes the heat of battery generated in the working process dissipated difficultly in time and heating the battery at low temperature slower and slower, especially in rapidly charging process, the quantity of heat is increased sharply and heat accumulation is more serious. How to control the working temperature of battery module composed of a large number of batteries and the temperature variations of each battery within a reasonable range, make the battery function the performance and slow down attenuation of the working life of the battery are the key technical problems to be resolved urgently in promoting new energy vehicles.

When the number of power batteries in the new energy vehicle is relatively larger, the quantity of heat usually accumulates easily in the working process, and air cooling way cannot satisfy the demand of the heat manage system, especially, after a rapid charging function is added, it requires that the heat manage system has better cooling ability, so the heat manage system needs to control the temperature of the battery by liquid cooling.

After batteries are assembled to form battery modules, the temperature of each battery module is usually controlled by an independent cooling unit, and at present, the cooling units mostly are connected together in series or in parallel, but the connection in series will make the pressure of the heat manage system drop excessively, cause the heat of the circulating liquid to accumulate in the flowing process and make heat exchange efficiency low; the connection in parallel will make the quantity of the circulating liquid in each cooling unit is small, which make heat exchange effect poor. When the number of battery modules is larger, the battery modules may be arranged in a multi-layer structure, which makes the heat manage system more complex.

SUMMARY OF THE PRESENT DISCLOSURE

In view of the problem existing in the background, an object of the present disclosure is to provide a battery heat exchange system, which can improve heat exchange efficiency, and realize temperature control of the battery modules.

In order to achieve the above object, the present disclosure provides a battery heat exchange system which comprises a liquid feeding mechanism, a heat exchange mechanism and a liquid draining mechanism. The liquid feeding mechanism provides a circulating liquid. The heat exchange mechanism is connected with the liquid feeding mechanism and comprises a plurality of heat exchange units and a plurality of connecting units; each heat exchange unit is used to heat or cool a corresponding battery module, and the plurality of connecting units are used to connect the heat exchange units together in series-parallel. The liquid draining mechanism is connected with the heat exchange mechanism, and the circulating liquid provided by the liquid feeding mechanism flows through the heat exchange mechanism and then is drained from the liquid draining mechanism.

The present disclosure has the following beneficial effects: in the battery heat exchange system according to the present disclosure, because the plurality of connecting units connect the heat exchange units together in series-parallel, the battery heat exchange system can ensure the quantity of the circulating liquid inside each heat exchange unit, avoid internal pressure of the battery heat exchange system dropping excessively, prevent heat of the circulating liquid from accumulating in the process of flow, improve heat exchange efficiency, and realize temperature control of the battery modules.

Figure 1:
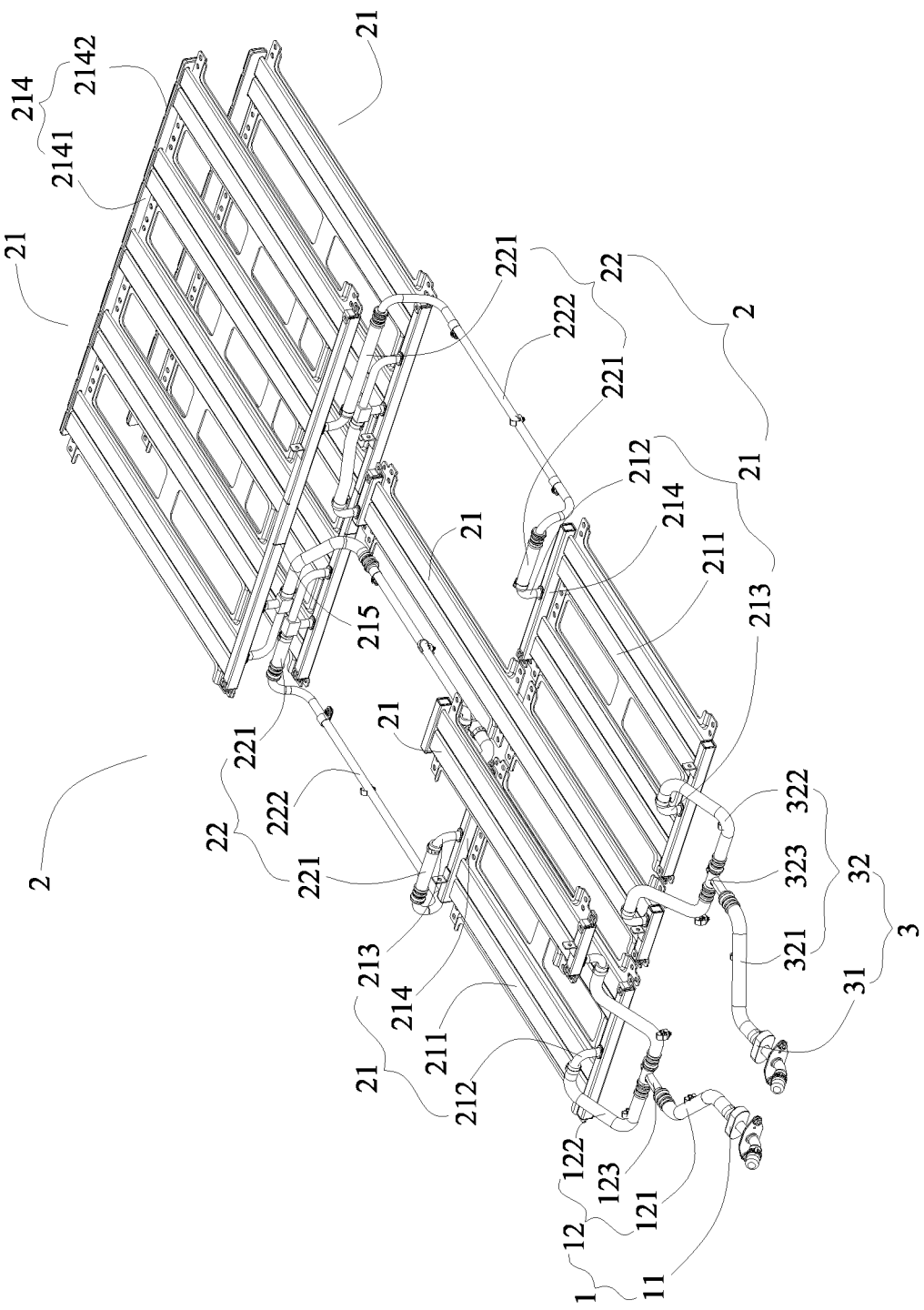
FIG. 1 is a schematic view of a battery heat exchange system according to the present disclosure.

Reference numerals in figures are represented as follows:
1 liquid feeding mechanism
  11 liquid feeding joint assembly
    111 liquid feeding connection pipe
      1111 liquid feeding fit convexity
    112 liquid feeding flange
      1121 liquid feeding groove
    113 liquid feeding seal ring
    114 liquid feeding coupling
    115 liquid feeding protection plate
    116 liquid feeding gasket
  12 liquid splitting assembly
    121 liquid splitting main pipe
    122 liquid splitting branch pipe
    123 liquid splitting joint
2 heat exchange mechanism
  21 heat exchange unit
    211 liquid cooling pipe
    212 liquid inlet coupler
    213 liquid outlet coupler
    214 liquid collecting pipe
      2141 connecting piece
        21411 through-hole
        21412 latching tooth
      2142 liquid collector
        21421 latching groove
    215 adjusting piece
  22 connecting unit
    221 soft connecting pipe
    222 hard connecting pipe
3 liquid draining mechanism
  31 liquid draining joint assembly
    311 liquid draining connection pipe
      3111 liquid draining fit convexity
    312 liquid draining flange
      3121 liquid draining groove
    313 liquid draining seal ring
    314 liquid draining joint
    315 liquid draining protection plate
    316 liquid draining gasket
  32 liquid converging assembly
    321 liquid converging main pipe
    322 liquid converging branch pipe
    323 liquid converging joint S1 protrusion
S2 protrusion
P1 projecting portion
P2 projecting portion

DETAILED DESCRIPTION

Hereinafter a battery heat exchange system according to the present disclosure will be described in detail in combination with the figures.

Referring to FIG. 1 to FIG. 20, a battery heat exchange system according to the present disclosure comprises a liquid feeding mechanism 1, a heat exchange mechanism 2 and a liquid draining mechanism 3. The liquid feeding mechanism 1 provides a circulating liquid. The heat exchange mechanism 2 is connected with the liquid feeding mechanism 1 and comprises a plurality of heat exchange units 21 and a plurality of connecting units 22. Each heat exchange unit 21 is used to heat or cool a corresponding battery module, and the plurality of connecting units 22 are used to connect the heat exchange units 21 together in series-parallel. The liquid draining mechanism 3 is connected with the heat exchange mechanism 2, and the circulating liquid provided by the liquid feeding mechanism 1 flows through the heat exchange mechanism 2 and then is drained from the liquid draining mechanism 3.

In the battery heat exchange system according to the present disclosure, because the plurality of connecting units 22 connect the heat exchange units 21 together in series-parallel, the battery heat exchange system can ensure the quantity of the circulating liquid inside each heat exchange unit 21, avoid internal pressure of the battery heat exchange system dropping excessively, prevent heat of the circulating liquid from accumulating in the process of flow, improve heat exchange efficiency, and realize temperature control of the battery modules.

It is noted that the plurality of connecting units 22 may connect the plurality of heat exchange units 21 together in series-parallel according to specifications and positions of the plurality of heat exchange units 21. In an embodiment, the plurality of heat exchange units 21 forms layers in position, and the heat exchange units 21 in each layer are connected in series, and the heat exchange units 21 in different layers are connected in parallel. In another embodiment, one large specification heat exchange unit 21 may be connected with small specification heat exchange units 21 in series at the same time (in other words, the small heat exchange units 21 are connected in parallel). In a word, the connection between the plurality of connecting units 22 can be flexibly set, and is not limited to the connection of the prior art which is in series or in parallel.

In the battery heat exchange system according to the present disclosure, referring to FIG. 1, the heat exchange mechanism 2 is divided into a plurality of heat exchange branches in parallel, and each heat exchange branch comprises some heat exchange units 21 of the plurality of heat exchange units 21 and some connecting units 22 which connect the some heat exchange units 21 together in series. Compared to a connecting way of the prior art in which all the heat exchange units 21 are connected in series, this is a preferred connecting way which can avoid the internal pressure of the battery heat exchange system dropping excessively, prevent the heat of the circulating liquid from accumulating in the process of flow and improve heat exchange efficiency by providing the plurality of heat exchange branches in parallel. At the same time, the heat exchange units 21 of each heat exchange branch are connected in series, which can ensure the quantity of the circulating liquid inside each heat exchange unit 21 and improve heat exchange efficiency. Certainly, the plurality of connecting units 22 may adopt any other specific series-parallel connecting way according to the requirements.

In the battery heat exchange system according to the present disclosure, referring to FIG. 1, the liquid feeding mechanism 1 comprises a liquid feeding joint assembly 11 and a liquid splitting assembly 12; the liquid feeding joint assembly 11 is connected with an external liquid feeding pipe (not shown); the liquid splitting assembly 12 is connected with the liquid feeding joint assembly 11, and the circulating liquid flowing into the liquid splitting assembly 12 is split into circulating liquid branches by the liquid splitting assembly 12, the circulating liquid branches flow into the heat exchange branches respectively. The liquid draining mechanism 3 comprises a liquid draining joint assembly 31 and a liquid converging assembly 32; the liquid draining joint assembly 31 is connected with an external liquid draining pipe (not shown); the liquid converging assembly 32 is connected between the liquid draining joint assembly 31 and the plurality of heat exchange branches, and converges the circulating liquid branches which flow through the plurality of heat exchange branches to the liquid draining joint assembly 31. The battery heat exchange system of the present disclosure may be used to cool or heat a battery pack (including the battery module) of the electric vehicle, and the liquid feeding joint assembly 11 and the liquid draining joint assembly 31 are connecting devices of the battery heat exchange system which are connected to the electric vehicle.

In the battery heat exchange system according to the present disclosure, the liquid feeding joint assembly 11 and the liquid draining joint assembly 31 are joints complying with VBRBAND DER AUTOBOMIL INDUSTRIE (VDA) standard, joints complying with Society of Automotive Engineers (SAE) standard or joints in any other forms.

In the battery heat exchange system according to the present disclosure, the battery heat exchange system is received and supported by a box (not shown). Referring to FIG. 2 to FIG. 5, the liquid feeding joint assembly 11 comprises a liquid feeding connection pipe 111, a liquid feeding flange 112 and a liquid feeding seal ring 113. One end of the liquid feeding connection pipe 111 is connected with the liquid splitting assembly 12 and the other end of the liquid feeding connection pipe 111 extends out of the box and is connected with the external liquid feeding pipe; the liquid feeding flange 112 is sheathed on the liquid feeding connection pipe 111 and is securely fixed to the box, and the liquid feeding flange 112 is provided with a liquid feeding groove 1121; the liquid feeding seal ring 113 is received in the liquid feeding groove 1121 and interposed between the liquid feeding flange 112 and the box. The liquid feeding flange 112 is fixed to the liquid feeding connection pipe 111 by welding. Protrusions S1 are provided on surfaces of the liquid feeding seal ring 113 which are connected with the liquid feeding flange 112, and can ensure interference fit between the liquid feeding flange 112 and the liquid feeding seal ring 113, thereby preventing the liquid feeding seal ring 113 from falling off during the installation process.

Referring to FIG. 7 to FIG. 10, the liquid draining joint assembly 31 comprises a liquid draining connection pipe 311, a liquid draining flange 312 and a liquid draining seal ring 313. One end of the liquid draining connection pipe 311 is connected with the liquid converging assembly 32 and the other end of the liquid draining connection pipe 311 extends out of the box and is connected with the external liquid draining pipe; the liquid draining flange 312 is sheathed on the liquid draining connection pipe 311 and is securely fixed to the box, and the liquid draining flange 312 is provided with a liquid draining groove 3121; the liquid draining seal ring 313 is received in the liquid draining groove 3121 and interposed between the liquid draining flange 312 and the box. The liquid draining flange 312 is fixed to the liquid draining connection pipe 311 by welding. Protrusions S2 are provided on surfaces of the liquid draining seal ring 313 which are connected with the liquid draining flange 312, and can ensure interference fit between the liquid draining flange 312 and the liquid draining seal ring 313, thereby preventing the liquid draining seal ring 313 from falling off during the installation process.

Figure 2:
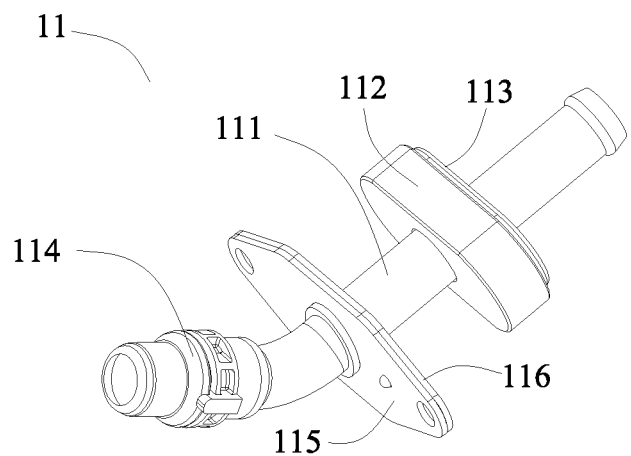
FIG. 2 is a schematic view of a liquid feeding joint assembly of the battery heat exchange system according to the present disclosure.
Figure 7:
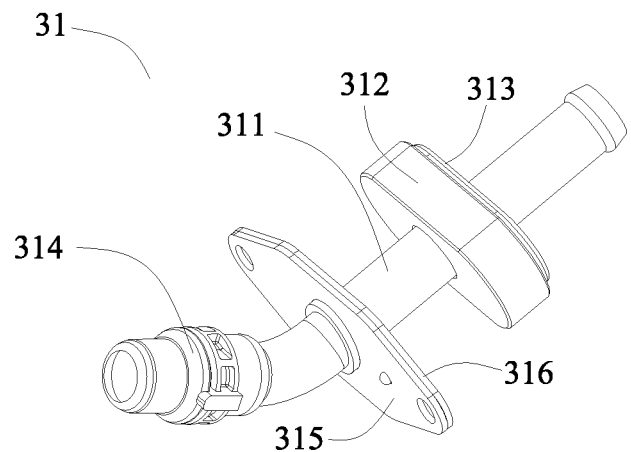
FIG. 7 is a schematic view of a liquid draining joint assembly of the battery heat exchange system according to the present disclosure.

In the battery heat exchange system according to the present disclosure, each of the external liquid feeding pipe and the external liquid draining pipe is provided with a receptacle (not shown). Referring to FIG. 2, the liquid feeding joint assembly 11 further comprises a liquid feeding coupling 114 fixed to the liquid feeding connection pipe 111; the liquid feeding coupling 114 and the receptacle of the external liquid feeding pipe fit with each other in pluggable form to connect the other end of the liquid feeding connection pipe 111 and the external liquid feeding pipe. Referring to FIG. 7, the liquid draining joint assembly 31 further comprises a liquid draining joint 314 fixed to the liquid draining connection pipe 311, and the liquid draining joint 314 and the receptacle of the external liquid draining pipe fit with each other in pluggable form to connect the other end of the liquid draining connection pipe 311 and the external liquid draining pipe. The liquid feeding connection pipe 111 may be connected to the liquid feeding pipe rapidly by means of the liquid feeding coupling 114 and the receptacle of the external liquid feeding pipe, and the liquid draining connection pipe 311 may be connected to the liquid draining pipe rapidly by means of the liquid draining joint 314 and the receptacle of the external liquid draining pipe, which will improve assembling efficiency, and such a pluggable form has high connection strength and good sealing. The liquid feeding connection pipe 111 is connected with the liquid feeding coupling 114 by means of pipe expanding method, and the liquid draining connection pipe 311 is connected with the liquid draining joint 314 by means of pipe expanding method.

Figure 3:
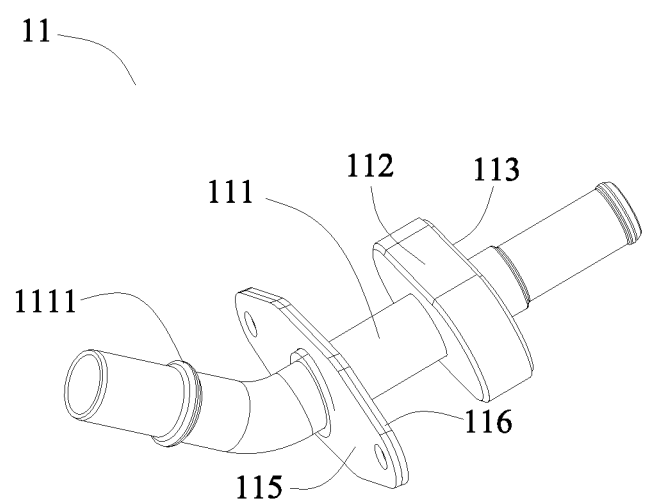
FIG. 3 is another schematic view of the liquid feeding joint assembly of the battery heat exchange system according to the present disclosure.
Figure 4:
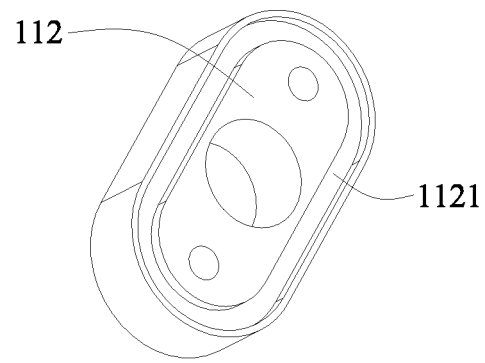
FIG. 4 is a schematic view of a liquid feeding flange of the liquid feeding joint assembly of the battery heat exchange system according to the present disclosure.
Figure 5:
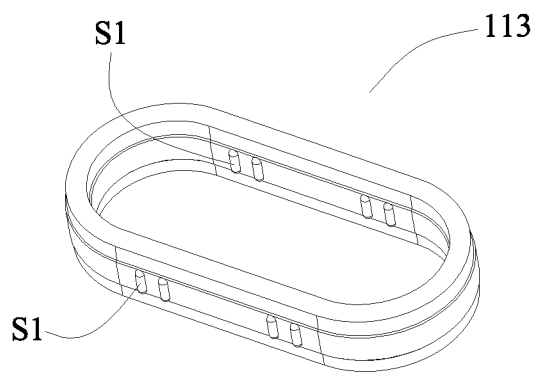
FIG. 5 is a schematic view of a liquid feeding seal ring of the liquid feeding joint assembly of the battery heat exchange system according to the present disclosure.
Figure 8:
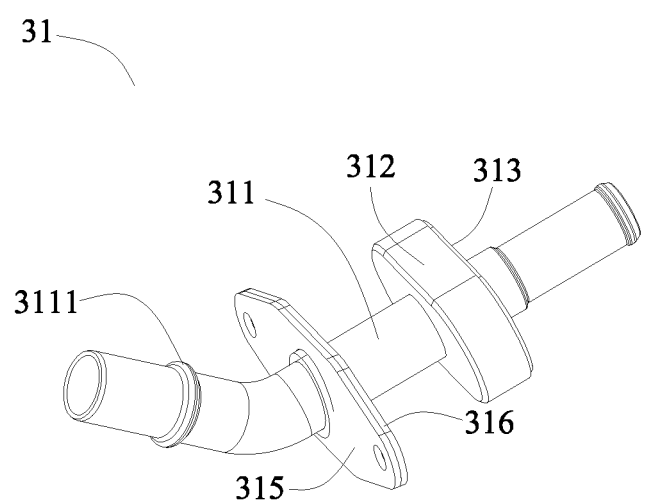
FIG. 8 is another schematic view of the liquid draining joint assembly of the battery heat exchange system according to the present disclosure.
Figure 9:
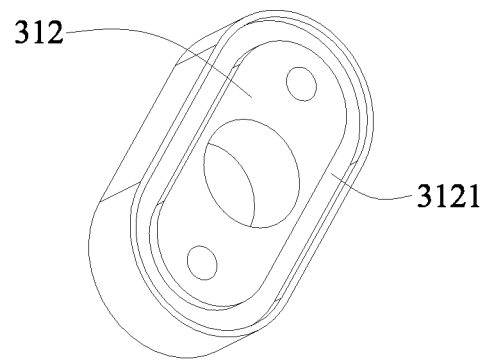
FIG. 9 is a schematic view of a liquid draining flange of the liquid draining joint assembly of the battery heat exchange system according to the present disclosure.
Figure 10:
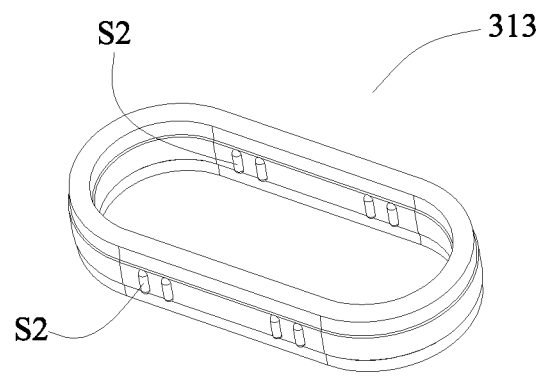
FIG. 10 is a schematic view of a liquid draining seal ring of the liquid draining joint assembly of the battery heat exchange system according to the present disclosure.
Figure 11:
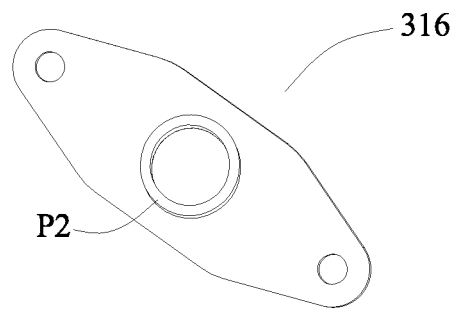
FIG. 11 is a schematic view of a liquid draining gasket of the liquid draining joint assembly of the battery heat exchange system according to the present disclosure.

In the battery heat exchange system according to the present disclosure, each of the external liquid feeding pipe and the external liquid draining pipe is provided with a receptacle (not shown). Referring to FIG. 3, the liquid feeding connection pipe 111 has a liquid feeding fit convexity 1111, the liquid feeding fit convexity 1111 and the receptacle of the external liquid feeding pipe fit with each other in pluggable form to connect the other end of the liquid feeding connection pipe 111 and the external liquid feeding pipe. Referring to FIG. 8, the liquid draining connection pipe 311 has a liquid draining fit convexity 3111, the liquid draining fit convexity 3111 and the receptacle of the external liquid draining pipe fit with each other in pluggable form to connect the other end of the liquid draining connection pipe 311 and the external liquid draining pipe. The liquid feeding fit convexity 1111 may be directly formed on the liquid feeding connection pipe 111, thereby omitting the liquid feeding coupling 114; the liquid draining fit convexity 3111 may be directly formed on the liquid draining connection pipe 311, thereby omitting the liquid draining joint 314.

In the battery heat exchange system according to the present disclosure, the liquid feeding connection pipe 111 may be connected with the external liquid feeding pipe by means of a rubber pipe and two hoops (an end of the rubber pipe is clamped to the liquid feeding connection pipe 111 by one hoop and the other end of the rubber pipe is clamped to the external liquid feeding pipe by the other hoop); similarly, the liquid draining connection pipe 311 may be connected with the external liquid draining pipe by means of a rubber pipe and two hoops.

Figure 6:
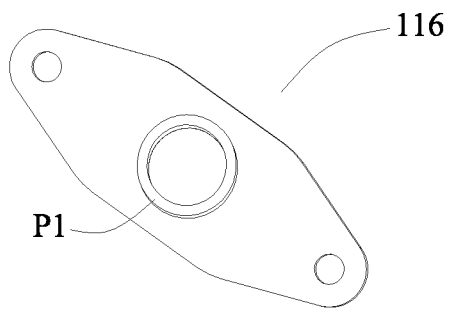
FIG. 6 is a schematic view of a liquid feeding gasket of the liquid feeding joint assembly of the battery heat exchange system according to the present disclosure.

In the battery heat exchange system according to the present disclosure, the liquid feeding flange 112 is fixed in a concave hole (not shown) of the box, and in order to avoid external foreign substance entering into the box via the concave hole, the concave hole needs to be sealed, therefore, referring to FIG. 2 and FIG. 3, the liquid feeding joint assembly 11 further comprises a liquid feeding protection plate 115 and a liquid feeding gasket 116, and both of the liquid feeding protection plate 115 and the liquid feeding gasket 116 are sheathed on the liquid feeding connection pipe 111, so as to seal the concave hole in which the liquid feeding flange 112 is fixed and improve the sealing; referring to FIG. 6, the liquid feeding gasket 116 may be provided with a projecting portion P1, and the liquid feeding protection plate 115 is sheathed on the projecting portion P1, thereby avoiding a direct contact between the liquid feeding protection plate 115 and the liquid feeding connection pipe 111, preventing the liquid feeding connection pipe 111 from being corroded by the liquid feeding protection plate 115 (normally, the liquid feeding connection pipe 111 and the liquid feeding protection plate 115 are made of different metal materials respectively, which will easily lead to electrochemical corrosion if the liquid feeding protection plate 115 is sheathed on the liquid feeding connection pipe 111 directly). Similarly, referring to FIG. 7, FIG. 8 and FIG. 11, the liquid draining joint assembly 31 may be provided with a liquid draining protection plate 315 and a liquid draining gasket 316, both of the liquid draining protection plate 315 and the liquid draining gasket 316 are sheathed on the liquid draining connection pipe 311, and the liquid draining gasket 316 may be provided with a projecting portion P2.

In the battery heat exchange system according to the present disclosure, referring to FIG. 1, the liquid splitting assembly 12 comprises: a liquid splitting main pipe 121 connected with the liquid feeding joint assembly 11; a plurality of liquid splitting branch pipes 122 connected with the heat exchange branches respectively; and a liquid splitting joint 123 connecting the liquid splitting main pipe 121 and the plurality of liquid splitting branch pipes 122. The liquid converging assembly 32 comprises: a liquid converging main pipe 321 connected with the liquid draining joint assembly 31; a plurality of liquid converging branch pipes 322 connected with the heat exchange branches respectively; and a liquid converging joint 323 connecting the liquid converging main pipe 321 and the plurality of liquid converging branch pipes 322. The liquid splitting joint 123 and the liquid converging joint 323 may be multi-way joints.

Figure 19:
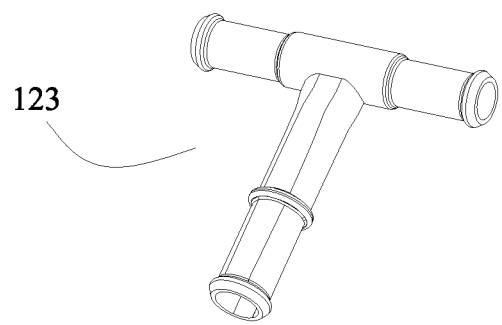
FIG. 19 is a schematic view of one liquid splitting joint of the battery heat exchange system according to the present disclosure.
Figure 20:
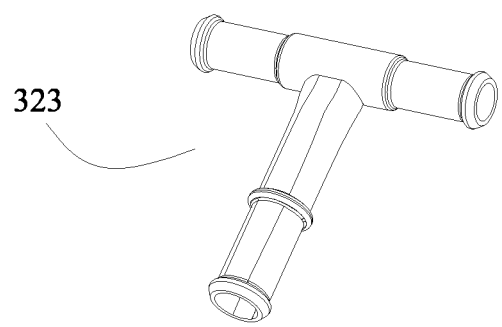
FIG. 20 is a schematic view of one liquid converging joint of the battery heat exchange system according to the present disclosure.

In the battery heat exchange system according to the present disclosure, the heat exchange branches are provided as two in number, the liquid splitting branch pipes 122 are provided as two in number and the liquid converging branch pipes 322 are provided as two in number. Referring to FIG. 19, the liquid splitting joint 123 is a three-way joint that made of two connecting pipes which are identical in diameter, two ends of one connecting pipe are latched with the two liquid splitting branch pipes 122 respectively (each liquid splitting branch pipe 122 is latched with the connecting pipe by an aluminium sheath, and the later mentioned latching process is realized by the aluminium sheath too), and a middle part of the one connecting pipe is provided with a liquid splitting opening, an end of the other one connecting pipe is latched with the liquid splitting main pipe 121, and the other end of the other one connecting pipe extends into the liquid splitting opening after a necking process and is sealed and connected to the liquid splitting opening. Referring to FIG. 20, the liquid converging joint 323 is a three-way joint that made of two connecting pipes which are identical in diameter, two ends of one connecting pipe are latched with the two liquid converging branch pipe 322 respectively, and a middle part of the one connecting pipe is provided with a liquid converging opening, an end of the other one connecting pipe is latched with the liquid converging main pipe 321, and the other end of the other one connecting pipe extends into the liquid converging opening after a necking process and is sealed and connected to the liquid converging opening.

Three-way joint of the prior art is usually a plastic three-way joint made by injection molding, but the size and the structure of the plastic three-way joint is limited to some extent. However, the liquid splitting joint 123 (or the liquid converging joint 323) is made of the two connecting pipes which are identical in diameter, so the production process is simple, the quantity is high, the cost is low and the shape and the length is not limited.

The two connecting pipes used for making the liquid splitting joint 123 (or the liquid converging joint 323) are metal pipes, the temperature of the circulating liquid in the liquid splitting joint 123 can be conveniently detected (because the metal material has good thermal conductivity, the temperature of the internal circulating liquid can be obtained by detecting the temperature of the wall of the connecting pipe, the metal material has lower risk of liquid leakage).

In the battery heat exchange system according to the present disclosure, the liquid splitting branch pipes 122 and the liquid converging branch pipes 322 are soft pipes and are securely fixed to the heat exchange branches respectively by hoops. Because the liquid splitting branch pipes 122 and the liquid converging branch pipes 322 are soft pipes, an angle of each liquid splitting branch pipe 122 and an angle of each liquid converging branch pipe 322 can be adjusted freely, which is suitable to connect with the heat exchange units 21 arranged in a multilayer structure.

Figure 12:
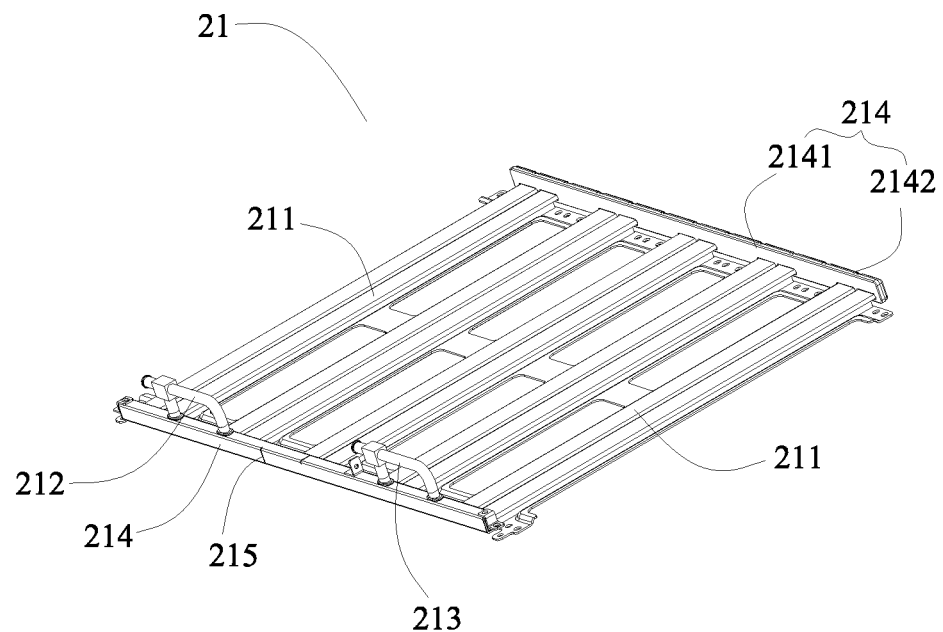
FIG. 12 is a schematic view of one heat exchange unit of the battery heat exchange system according to the present disclosure.
Figure 13:
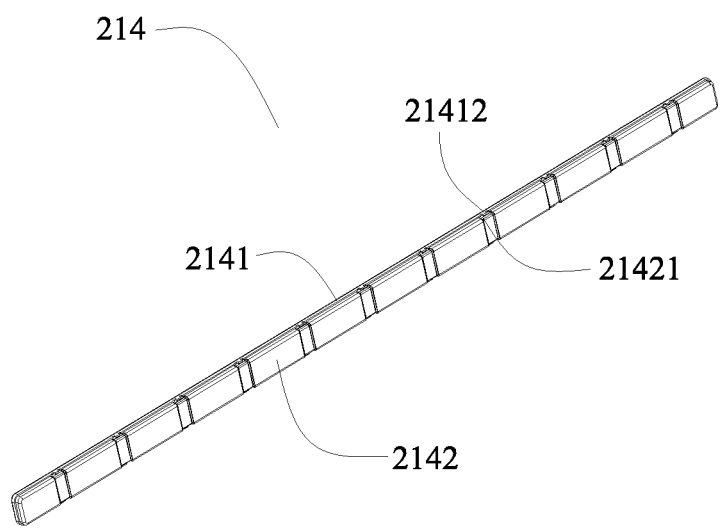
FIG. 13 is a schematic view of a liquid collecting pipe of the heat exchange unit of the battery heat exchange system according to the present disclosure.
Figure 14:
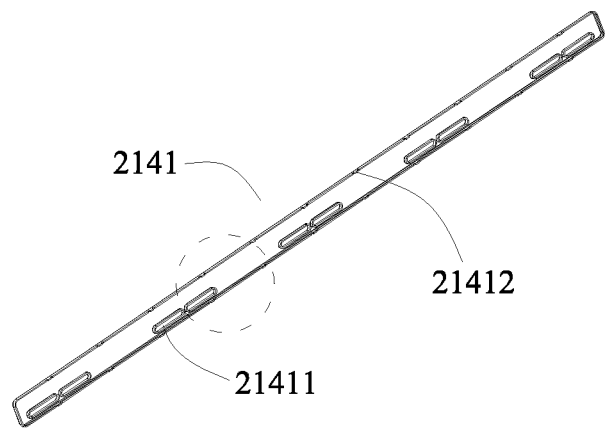
FIG. 14 is a schematic view of a connecting piece of the liquid collecting pipe shown in FIG. 13.
Figure 15:
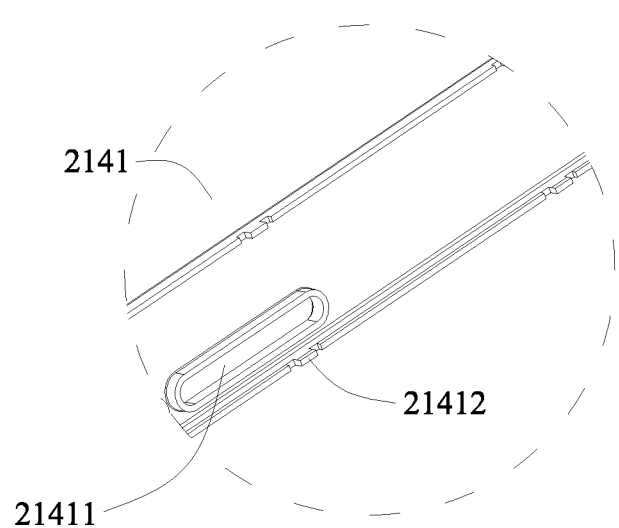
FIG. 15 is an enlarged view of a part surrounded by a dotted circle shown in FIG. 14.
Figure 16:
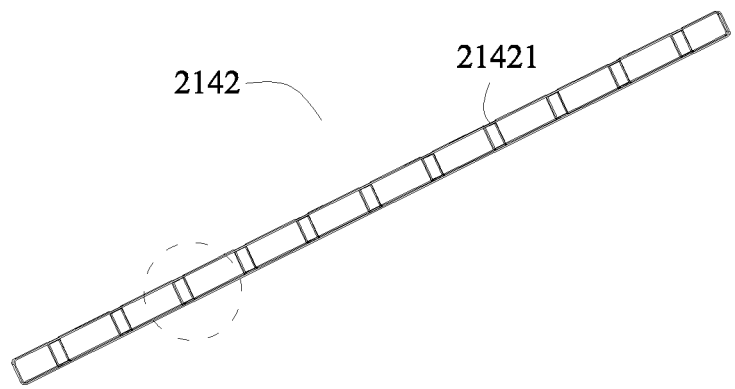
FIG. 16 is a schematic view of a liquid collector of the liquid collecting pipe shown in FIG. 13.
Figure 17:
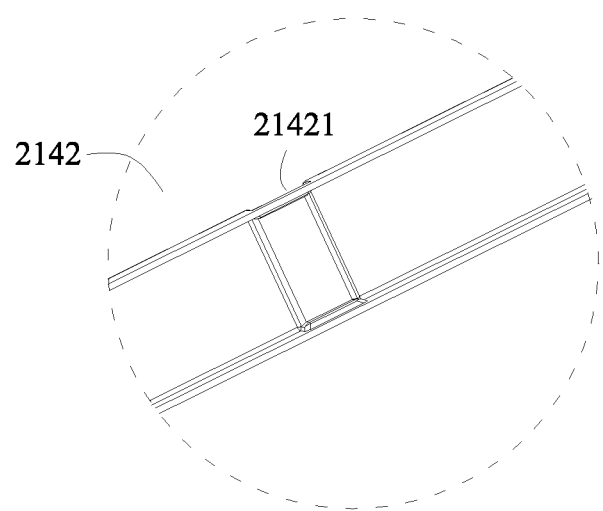
FIG. 17 is an enlarged view of a part surrounded by a dotted circle shown in FIG. 16.

In the battery heat exchange system according to the present disclosure, referring to FIG. 1 and FIG. 12, each heat exchange unit 21 comprises a plurality of liquid cooling pipes 211, two liquid collecting pipes 214, a liquid inlet coupler 212 and a liquid outlet coupler 213. The plurality of liquid cooling pipes 211 are arranged in parallel and are used for supporting and installing the battery modules, so as to heat or cool the battery modules; the two liquid collecting pipes 214 are provided at two ends of the plurality of liquid cooling pipes 211 and connected with the plurality of liquid cooling pipes 211; the liquid inlet coupler 212 is provided to one liquid collecting pipe 214 in which the circulating liquid flows via the liquid inlet coupler 212; the liquid outlet coupler 213 is provided in one liquid collecting pipe 214 from which the circulating liquid is drained via the liquid outlet coupler 213.

In the battery heat exchange system according to the present disclosure, the liquid inlet coupler 212 and the liquid outlet coupler 213 are provided to the two different liquid collecting pipes 214 respectively (this arranging way aims for any one heat exchange unit 21, it does not mean that all the heat exchange units 21 are provided in this arranging way).

In the battery heat exchange system according to the present disclosure, referring to FIG. 12, the liquid inlet coupler 212 and the liquid outlet coupler 213 are provided to one liquid collecting pipe 214 (this arranging way aims for any one heat exchange unit 21, it does not mean that all the heat exchange units 21 are provided in this arranging way); referring to FIG. 13 to FIG. 17, the other one liquid collecting pipe 214 comprises a connecting piece 2141 and a liquid collector 2142. The connecting piece 2141 has a plurality of through-holes 21411 connected with the liquid cooling pipes 211 respectively and a plurality of latching teeth 21412 provided to edges of the connecting piece 2141. The liquid collector 2142 has a plurality of latching grooves 21421 corresponding to the latching teeth 21412 respectively. The connecting piece 2141 is sealed and connected to the liquid collector 2142 via engagement between the latching teeth 21412 and the latching grooves 21421, thereby forming a flow channel between the connecting piece 2141 and the liquid collector 2142 for flow of liquid.

One liquid collecting pipe 214 herein is a square pipe, two covers are provided at two ends of the liquid collecting pipe 214 respectively to seal the two ends of the liquid collecting pipe 214, and in order to provide the liquid inlet coupler 212 or the liquid outlet coupler 213 on the liquid collecting pipe 214, the liquid collecting pipe 214 needs to have a large width and occupy large space; but when the liquid inlet coupler 212 and the liquid outlet coupler 213 are provided to one liquid collecting pipe 214, the width of the other one liquid collecting pipe 214 can be reduced, which will save the space occupied by the other one liquid collecting pipe 214. Moreover, the connecting piece 2141 and the liquid collector 2142 are latched with each other to form the other one liquid collecting pipe 214, so the other one liquid collecting pipe 214 has a simple structure and can be assembled conveniently. In order to improve sealing between the connecting piece 2141 and the liquid collector 2142, edges of the connecting piece 2141 can be welded with edges of the liquid collector 2142.

Figure 18:
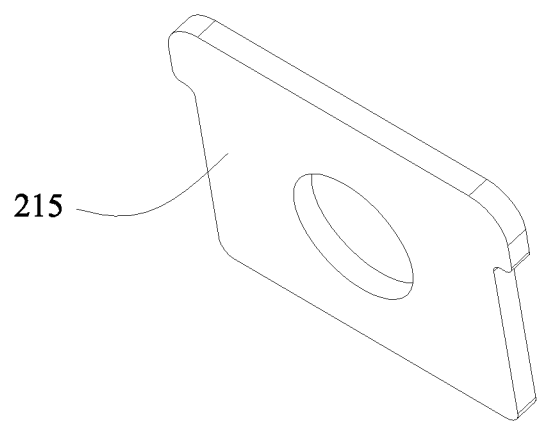
FIG. 18 is a schematic view of an adjusting piece of the battery heat exchange system according to the present disclosure.

In the battery heat exchange system according to the present disclosure, referring to FIG. 1, FIG. 12 and FIG. 18, each heat exchange unit 21 comprises an adjusting piece 215, and the adjusting piece 215 is provided in the corresponding liquid collecting pipe 214 so as to adjust quantity of the circulating liquid in the corresponding liquid collecting pipe 214. The liquid inlet coupler 212 may be a multi-way joint or a two-way joint. The liquid outlet coupler 213 may be a multi-way joint or a two-way joint. In a large heat exchange unit 21, if the liquid inlet coupler 212 or the liquid outlet coupler 213 is a two-way joint (in other words, the circulating liquid only can flow into or be drained from the liquid collecting pipe 214 via one opening), it leads to uneven distribution of the quantity of the circulating liquid in different parts of the liquid collecting pipe 214 easily; and if the liquid inlet coupler 212 is a multi-way joint, it can provide openings (the circulating liquid can flow into the liquid collecting pipe 214 via the openings) and adjust the quantity of the circulating liquid in different parts of the liquid collecting pipe 214 effectively and improve uniformity of the circulating liquid. Similarly, if the liquid outlet coupler 213 is a multi-way joint, it can provide openings (the circulating liquid can be drained from the liquid collecting pipe 214 via the openings) and adjust the quantity of the circulating liquid in different parts of the liquid collecting pipe 214 effectively and improve uniformity of the circulating liquid.

In the battery heat exchange system according to the present disclosure, referring to FIG. 1, each connecting unit 22 comprises: two soft connecting pipes 221 securely fixed to the liquid outlet coupler 213 of one heat exchange unit 21 and the liquid inlet coupler 212 of another heat exchange unit 21 respectively; and a hard connecting pipe 222 connecting the two soft connecting pipes 221. Two heat exchange units 21 in different positions can be connected together by changing bending angles and height of the hard connecting pipe 222.

In the battery heat exchange system according to the present disclosure, the two soft connecting pipes 221 are securely connected to the heat exchange units 21 by means of hoops.

What is claimed is:

1. A battery heat exchange system, comprising a liquid feeding mechanism, a heat exchange mechanism and a liquid draining mechanism;
   wherein
   the liquid feeding mechanism provides a circulating liquid;
   the heat exchange mechanism is connected with the liquid feeding mechanism and comprises a plurality of heat exchange units and a plurality of connecting units; each heat exchange unit is used to heat or cool a corresponding battery module, and the plurality of connecting units are used to connect the heat exchange units together;
   the liquid draining mechanism is connected with the heat exchange mechanism, and the circulating liquid provided by the liquid feeding mechanism flows through the heat exchange mechanism and then is drained from the liquid draining mechanism;
   each heat exchange unit comprises a plurality of liquid cooling pipes used to heat or cool the battery modules; and two liquid collecting pipes provided at two ends of the plurality of liquid cooling pipes and connected to the plurality of liquid cooling pipes; and
   one of the liquid collecting pipes comprises a connecting piece and a liquid collector, the connecting piece has a plurality of through-holes connected to the liquid cooling pipes respectively, and a flow channel is formed between the connecting piece and the liquid collector for flow of liquid.

2. The battery heat exchange system according to claim 1, wherein
   the liquid feeding mechanism comprises a liquid feeding joint assembly and a liquid splitting assembly; the liquid feeding joint assembly is connected with an external liquid feeding pipe; the liquid splitting assembly is connected with the liquid feeding joint assembly, and the circulating liquid flowing into the liquid splitting assembly is split into circulating liquid branches by the liquid splitting assembly, the circulating liquid branches flow into the heat exchange branches respectively;
   the liquid draining mechanism comprises a liquid draining joint assembly and a liquid converging assembly; the liquid draining joint assembly is connected with an external liquid draining pipe; the liquid converging assembly is connected between the liquid draining joint assembly and the plurality of heat exchange branches, and converges the circulating liquid branches which flow through the plurality of heat exchange branches to the liquid draining joint assembly.

3. The battery heat exchange system according to claim 2, wherein
   the battery heat exchange system is received and supported by a box;
   the liquid feeding joint assembly comprises a liquid feeding connection pipe, a liquid feeding flange and a liquid feeding seal ring;
   one end of the liquid feeding connection pipe is connected with the liquid splitting assembly and the other end of the liquid feeding connection pipe extends out of the box and is connected with the external liquid feeding pipe;

the liquid feeding flange is sheathed on the liquid feeding connection pipe and is securely fixed to the box, and the liquid feeding flange is provided with a liquid feeding groove;

the liquid feeding seal ring is received in the liquid feeding groove and interposed between the liquid feeding flange and the box;

the liquid draining joint assembly comprises a liquid draining connection pipe, a liquid draining flange and a liquid draining seal ring;

one end of the liquid draining connection pipe is connected with the liquid converging assembly and the other end of the liquid draining connection pipe extends out of the box and is connected with the external liquid draining pipe;

the liquid draining flange is sheathed on the liquid draining connection pipe and is securely fixed to the box, and the liquid draining flange is provided with a liquid draining groove;

the liquid draining seal ring is received in the liquid draining groove and interposed between the liquid draining flange and the box.

4. The battery heat exchange system according to claim 2, wherein the liquid splitting assembly comprises: a liquid splitting main pipe connected with the liquid feeding joint assembly; a plurality of liquid splitting branch pipes connected with the heat exchange branches respectively; and a liquid splitting joint connecting the liquid splitting main pipe and the plurality of liquid splitting branch pipes;

the liquid converging assembly comprises: a liquid converging main pipe connected with the liquid draining joint assembly; a plurality of liquid converging branch pipes connected with the heat exchange branches respectively; and a liquid converging joint connecting the liquid converging main pipe and the plurality of liquid converging branch pipes.

5. The battery heat exchange system according to claim 4, wherein the liquid splitting branch pipes and the liquid converging branch pipes are securely fixed to the heat exchange branches respectively by hoops.

6. The battery heat exchange system according to claim 1, wherein each heat exchange unit comprises, a liquid inlet coupler and a liquid outlet coupler;

the plurality of liquid cooling pipes are arranged in parallel and are used for supporting and installing the battery modules;

the liquid inlet coupler is provided to one liquid collecting pipe in which the circulating liquid flows via the liquid inlet coupler; and the liquid outlet coupler is provided to one liquid collecting pipe from which the circulating liquid is drained via the liquid outlet coupler.

7. The battery heat exchange system according to claim 6, wherein the liquid inlet coupler and the liquid outlet coupler are provided to the two different liquid collecting pipes respectively.

8. The battery heat exchange system according to claim 6, wherein each heat exchange unit comprises an adjusting piece, and the adjusting piece is provided in the corresponding liquid collecting pipe so as to adjust quantity of the circulating liquid in the corresponding liquid collecting pipe;

the liquid inlet coupler is a multi-way joint or a two-way joint;

the liquid outlet coupler is a multi-way joint or a two-way joint.

9. The battery heat exchange system according to claim 6, wherein each connecting unit comprises: two first connecting pipes securely fixed to the liquid outlet coupler of one heat exchange unit and the liquid inlet coupler of another heat exchange unit respectively; and a second connecting pipe connecting the two first connecting pipes; and the first connecting pipe is softer than the second connecting pipe.

10. The battery heat exchange system according to claim 6, wherein the liquid inlet coupler and the liquid outlet coupler are provided to the other one liquid collecting pipe; the connecting piece has a plurality of latching teeth provided to edges of the connecting piece; the liquid collector has a plurality of latching grooves corresponding to the latching teeth respectively; the connecting piece is sealed and connected to the liquid collector via engagement between the latching teeth and the latching grooves, thereby forming the flow channel between the connecting piece and the liquid collector for flow of liquid.

11. The battery heat exchange system according to claim 1, wherein the heat exchange mechanism is divided into a plurality of heat exchange branches arranged in parallel, and each heat exchange branch comprises multiple heat exchange units of the plurality of heat exchange units and one or more connecting units of the plurality of connecting units which connect the multiple heat exchange units together in series.

* * * * *